United States Patent
Plasencia et al.

(10) Patent No.: US 11,912,601 B2
(45) Date of Patent: Feb. 27, 2024

(54) METHOD AND SYSTEM FOR WATER INJECTION INTO AN OIL AND/OR GAS CONTAINING SUBTERRANEAN FORMATION

(71) Applicant: Vetco Gray Scandinavia AS, Sandvika (NO)

(72) Inventors: Jose Luis Plasencia, Blommenholm (NO); Hua Wang, Clifton Park, NY (US)

(73) Assignee: Vetco Gray Scandinavia AS, Sandvika (NO)

( * ) Notice: Subject to any disclaimer, the term of this patent is extended or adjusted under 35 U.S.C. 154(b) by 220 days.

(21) Appl. No.: 15/741,315

(22) PCT Filed: Jun. 30, 2016

(86) PCT No.: PCT/EP2016/065316
§ 371 (c)(1),
(2) Date: Jan. 2, 2018

(87) PCT Pub. No.: WO2017/001567
PCT Pub. Date: Jan. 5, 2017

(65) Prior Publication Data
US 2018/0194658 A1    Jul. 12, 2018

(30) Foreign Application Priority Data

Jul. 2, 2015 (NO) .................................. 20150890

(51) Int. Cl.
*C02F 9/00* (2023.01)
*B01D 61/04* (2006.01)
(Continued)

(52) U.S. Cl.
CPC .............. *C02F 9/00* (2013.01); *B01D 61/027* (2013.01); *B01D 61/04* (2013.01); *B01D 61/58* (2013.01);
(Continued)

(58) Field of Classification Search
CPC .... C02F 9/00; C02F 1/00; C02F 1/001; C02F 1/30; C02F 1/307; C02F 1/44;
(Continued)

(56) References Cited

U.S. PATENT DOCUMENTS 3,846,296 A * 11/1974 Hay .......................... G21K 5/02
210/668
3,904,882 A 9/1975 Lund et al.
(Continued)

FOREIGN PATENT DOCUMENTS

AU    2013320028 A1    4/2015
DE    24 05 295 A1    8/1975
(Continued)

OTHER PUBLICATIONS

GE Reports, GE Introduces New Membrane to Remove Seawater Sulfate from Injection Water for Oshore Oil Production, May 4, 2015. (Year: 2015).*
(Continued)

*Primary Examiner* — Allison G Fitzsimmons
(74) *Attorney, Agent, or Firm* — Hogan Lovells US LLP

(57) ABSTRACT

A method and system for water injection into an oil and/or gas containing subterranean formation is shown, the method comprising: arranging a submerged water filtration station with a pump feeding inlet seawater through at least one filtering membrane to a water injection pump, subjecting the water to ionizing irradiation at a location between the seawater inlet and the water injection pump, whereby at said location the water is guided past a submerged radiation
(Continued)

source which is distributed for penetration of the body of injection water.

9 Claims, 4 Drawing Sheets

(51) Int. Cl.
| | |
|---|---|
| E21B 43/20 | (2006.01) |
| C02F 1/30 | (2023.01) |
| C02F 1/44 | (2023.01) |
| B01D 61/02 | (2006.01) |
| B01D 61/58 | (2006.01) |
| C02F 103/08 | (2006.01) |
| B01D 61/14 | (2006.01) |
| C02F 1/32 | (2023.01) |
| C02F 101/30 | (2006.01) |

(52) U.S. Cl.
CPC .............. *C02F 1/307* (2013.01); *C02F 1/441* (2013.01); *C02F 1/444* (2013.01); *E21B 43/20* (2013.01); *B01D 61/145* (2013.01); *B01D 61/147* (2013.01); *B01D 2311/04* (2013.01); *B01D 2311/2611* (2013.01); *B01D 2311/2649* (2013.01); *C02F 1/32* (2013.01); *C02F 1/442* (2013.01); *C02F 2101/30* (2013.01); *C02F 2103/08* (2013.01); *C02F 2201/3227* (2013.01); *C02F 2303/04* (2013.01); *C02F 2307/14* (2013.01)

(58) Field of Classification Search
CPC ...... C02F 1/441; C02F 1/442; C02F 2103/00; C02F 2103/08; C02F 2201/00; C02F 2201/32; C02F 2201/322; C02F 2307/00; C02F 1/305; C02F 1/32; C02F 1/006; C02F 1/302; C02F 1/325; C02F 2101/00; C02F 2101/10; C02F 2101/30; C02F 2101/32; C02F 2103/10; C02F 2103/12; C02F 2103/16; C02F 2103/34; C02F 2201/001; C02F 2201/002; C02F 2201/007; C02F 2201/324; C02F 2201/326; C02F 2201/3221; C02F 2201/3222; C02F 2201/3223; C02F 2201/3224; C02F 2201/3225; C02F 2201/3226; C02F 2201/3227; C02F 2201/3228; C02F 2201/328; C02F 2201/48; C02F 2201/04; C02F 2201/08; C02F 2303/00; C02F 2303/04; C02F 2303/20; C02F 2303/22; C02F 2307/08; C02F 2307/14; B01D 29/00; B01D 29/50; B01D 29/56; B01D 35/00; B01D 35/02; B01D 35/06; B01D 36/02; B01D 37/00; B01D 37/04; B01D 61/00; B01D 61/02; B01D 61/027; B01D 61/04; B01D 61/58; B01D 61/08; B01D 63/00; B01D 2259/80; B01D 2259/804; B01D 2259/812; B01D 2311/04; A61L 2/08; A61L 2/081; A61L 2/082; A61L 2/087; A61L 2/10; B01J 19/082; B01J 19/085; B01J 19/123; B01J 19/125; B01J 2219/0877

USPC ......... 210/747.1, 747.5, 767, 800, 804, 806, 210/170.01, 170.09, 170.11, 255, 259, 210/294, 295, 321.6, 321.72, 322, 323.1, 210/416.1, 652

See application file for complete search history.

(56) References Cited

U.S. PATENT DOCUMENTS

| | | | | |
|---|---|---|---|---|
| 4,238,335 | A | * | 12/1980 | Grimsley ............... B01D 24/06 210/802 |
| 4,958,683 | A | | 9/1990 | Alford et al. |
| 7,600,567 | B2 | | 10/2009 | Christopher et al. |
| 7,802,623 | B2 | | 9/2010 | Lunde et al. |
| 2004/0262235 | A1 | * | 12/2004 | Taghipour ............. B01J 19/125 210/748.11 |
| 2005/0230320 | A1 | * | 10/2005 | Evans .................... C02F 1/325 210/748.11 |
| 2007/0102359 | A1 | * | 5/2007 | Lombardi ............ B01D 61/022 210/639 |
| 2013/0236353 | A1 | | 9/2013 | Blechschmidt et al. |
| 2014/0339147 | A1 | | 11/2014 | Accomando et al. |

FOREIGN PATENT DOCUMENTS

| | | | | |
|---|---|---|---|---|
| KR | 10-2012-0008993 | A | | 2/2012 |
| KR | 20120008993 | A | | 2/2012 |
| NO | 316918 | B1 | | 6/2004 |
| WO | 95/015294 | A1 | | 6/1995 |
| WO | 2004/090284 | A1 | | 10/2004 |
| WO | WO-2004090284 | A1 | * | 10/2004 ............ B01F 1/0038 |
| WO | 2004/106697 | A1 | | 12/2004 |
| WO | 2013/012548 | A1 | | 1/2013 |

OTHER PUBLICATIONS

Amin MM, Hashemi H, Bina B, Hatamzadeh M, Abdellahi M. Disinfection of water and wastewater of Isfahan water and wastewater treatment plants by gamma irradiation. Int J Env Health Eng 2013 ;2:16-16 (Year: 2013).*
Office action and Search issued in connection with corresponding NO Application No. 20150890 dated Aug. 17, 2018 (Official copy not available).
Office Action and Search issued in connection with corresponding NO Application No. 20150890 dated Jan. 22, 2016.
International Search Report and Written Opinion issued in connection with corresponding PCT Application No. PCT/EP2016/065316 dated Oct. 4, 2016.
International Preliminary Report on Patentability issued in connection with corresponding PCT Application No. PCT/EP2016/065316 dated Sep. 19, 2017.

* cited by examiner

Fig. 3
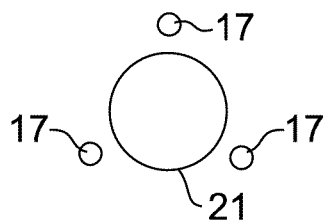
Fig. 4
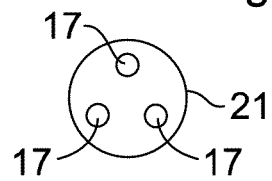
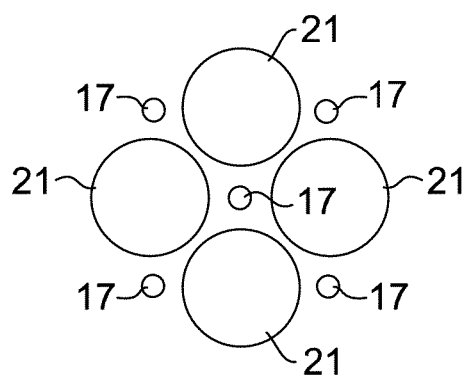
Fig. 5
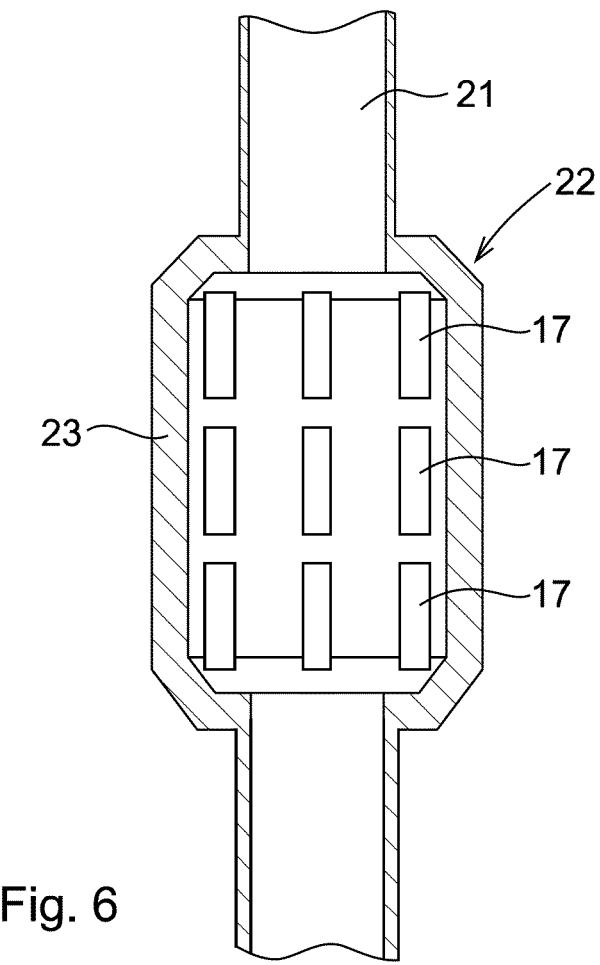
Fig. 6

METHOD AND SYSTEM FOR WATER INJECTION INTO AN OIL AND/OR GAS CONTAINING SUBTERRANEAN FORMATION

TECHNICAL FIELD OF THE INVENTION

The present invention relates to a method and system for water injection into an oil and/or gas containing subterranean formation, in an embodiment in conjunction with enhanced oil or gas recovery.

BACKGROUND AND PRIOR ART

In hydrocarbon production injection of water in oil or gas containing formations is a widely used method to assist in the recovery of hydrocarbon products by raising the pressure in the formation and in this way prolonging the productive life of an oil or gas production field. Water injection is practised in onshore as well as in subsea gas and oil recovery processes, and available sources of injection water are, e.g., freshwater, salt water and produced water that is generated through separation of a multiphase fluid at the production site. In subsea hydrocarbon production seawater is typically used for injection. Due to its content of organic and inorganic material seawater is however less suitable for injection and requires processing before injection. Processing seawater into water suitable for injection purposes can include different stages of filtration, ionic content removal and disinfection aiming to remove organic and inorganic material which might otherwise lead to problems such as bacteria reproduction and reservoir souring, corrosion and scaling on downstream equipment, etc. The organic material concerned comprises, among others, microorganisms such as bacteria, plankton and viruses.

A method of producing injection water from seawater is previously known from U.S. Pat. No. 7,600,567 B2. The method disclosed in U.S. Pat. No. 7,600,567 B2 includes separation and desalination in combination with the dosing of chemical concentrates. Another example of subsea chemical treatment of injection water is known from U.S. Pat. No. 316,918 B1 according to which the water is brought in contact with a solid-state chemical such as chlorine or a biocide.

However, disinfection of injection water by the use of chemicals such as chlorine, copper or biocide compounds will result in chemicals which remain in the water subsequently being injected into the reservoir. Use of chemicals for disinfection of injection water can thus deteriorate downstream system components, be environmentally hazardous and is undesired.

U.S. Pat. No. 7,802,623 B1 discloses a method and device for destruction of organic material in injection water for an injection well that avoids the addition of a chemical. An electrochemical cell is connected to an injection well, and injection water is conducted through the cell for in situ generation of a reactive oxygen compound by radiolysis, using injection water as source material for the radiolysis.

U.S. Pat. No. 7,802,623 B1 also mentions UV sterilization as alternative method to kill and/or to inhibit organism-growth in injection water. UV light irradiation is a non-ionizing sterilization method widely used in the treatment of wastewater. UV light inactivates microorganisms by causing photochemical damage to nucleic acids in the DNA of the microorganisms. UV light however cannot penetrate particles by transmission through solid material and suspended particles in the water may therefor increase microbial survival by shielding microorganisms from the UV radiation. Fouling on the outside of UV tube walls reduces the effectiveness of UV irradiation and is another problem which makes UV irradiation less useful in the subsea environment.

Another sterilization method is ionizing irradiation using high energy electrons or gamma radiation. Ionizing radiation can be seen to cause an indirect effect on microorganisms. Applied to aqueous material irradiation by gamma radiation produces highly reactive and unstable components such as hydroxyl radicals and hydrated electrons which cause chemical changes within the microorganisms.

Ionizing irradiation of seawater is previously disclosed for cooling purposes in DE 24 05 295 wherein a gamma ray source is installed in a tube that feeds water to a heat exchanger in a turbine power plant. The inlet water passes a rotating filter before entering the tube with the radioactive radiation source.

SUMMARY OF THE INVENTION

One embodiment of the present invention is provides an alternative method for injection of water into an oil and/or gas containing subterranean formation comprising inactivation of microorganisms in seawater without the use of chemicals.

Another embodiment of the present invention provides a system for injection of water into an oil and/or gas containing subterranean formation which can easily be integrated with water treatment equipment adapted for removing organic and inorganic material in the water.

One embodiment of the present invention provides a method and a system for injection of water into an oil and/or gas containing subterranean formation that has low demands for maintenance and/or operating power.

The objects are achieved by means of the features disclosed below and in the accompanying claims.

In one aspect of the present invention the embodiments are achieved by a method for water injection into an oil and/or gas containing subterranean formation, the method comprising: arranging a submerged water filtration station with a pump feeding inlet seawater through at least one filtering membrane to a water injection pump, subjecting the water to ionizing irradiation at a location between the seawater inlet and the water injection pump, whereby at said location the water is guided past a submerged radiation source which is distributed for penetration of the body of injection water.

The step of ionizing irradiation is followed by fine filtration to remove inactivated organic material from the injection water, in an embodiment.

In one embodiment the step of ionizing irradiation is preceded by coarse filtration to remove inorganic material from the injection water before irradiation.

In one embodiment the step of ionizing irradiation is followed by filtration through a semipermeable membrane of microfiltration, ultrafiltration or nanofiltration pore size.

In one embodiment the step of ionizing irradiation is followed by desalination through reverse osmosis.

In one embodiment the water is subjected to ionizing irradiation from a radioactive radiation source emitting gamma radiation.

In another embodiment of the present invention the embodiments are achieved by a system for water injection into an oil and/or gas containing subterranean formation, the system comprising: a submerged water filtration station with a pump feeding inlet seawater through at least one filtering membrane to a water injection pump, an ionizing irradiation stage installed at a location between the seawater inlet and the water injection pump, whereby at said location the water is guided past a submerged radiation source which is distributed for penetration of the body of injection water.

In one embodiment the radiation source comprises one or multiple radiation elements arranged about the exterior of a pipe section of the submerged water filtration station.

In one embodiment the radiation source comprises one or multiple radiation elements arranged in the interior of a pipe section of the submerged water filtration station.

In one embodiment the radiation source comprises multiple radiation elements distributed along the exteriors or along the interiors of a multiplicity of parallel pipe sections in array configuration.

In one embodiment the radiation source comprises multiple radiation elements distributed over the sectional area of a widened pipe section or tank wherein water flow velocity is reduced.

In one embodiment the radiation source includes a shielding capsule functioning as pipe or tank wall.

One or multiple radiation sources may alternatively or additionally be placed in a coarse filter, a membrane filter, a pump or any other component in the system to improve disinfection.

These embodiments and other details of the subject water injection method and system will be further explained in the following detailed description of embodiments.

BRIEF DESCRIPTION OF THE DRAWINGS

In the following detailed description reference will be made to the accompanying schematic drawings, wherein FIGS. 3-5 show alternative designs for the distribution of radioactive elements in a radiation source for the water injection system, FIG. 6 shows another alternative design for the distribution of radioactive elements.

DETAILED DESCRIPTION

Figure 1:
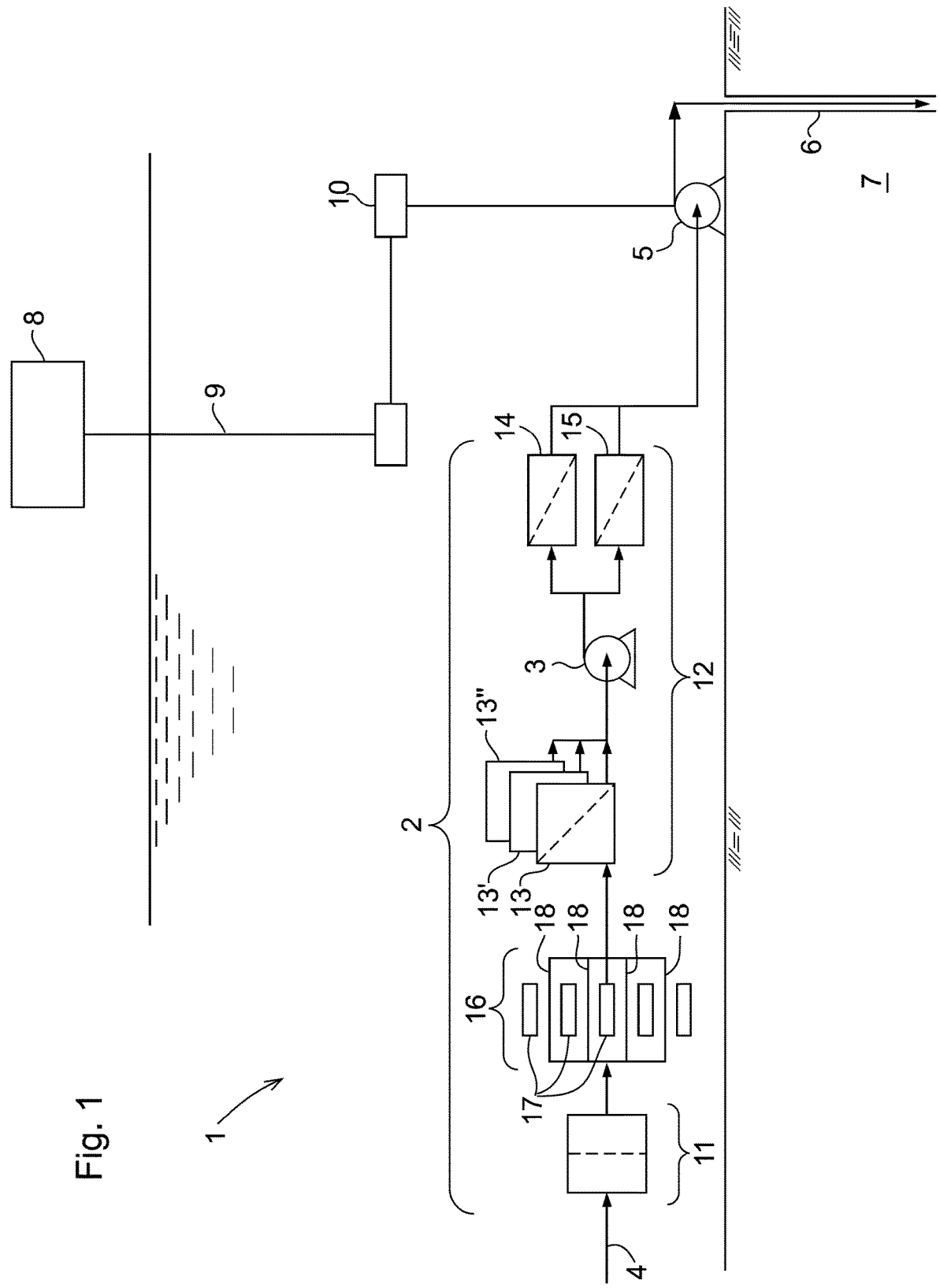
FIG. 1 shows the layout of a water injection system configured for practising the water injection method.

With reference to FIG. 1 a water injection system 1 briefly comprises a submerged water filtration station 2, a pump 3 feeding seawater through the filtration station from a seawater inlet 4 to a water injection pump 5 by which treated water is injected into an injection well 6 in an oil and/or gas containing subterranean formation 7. The water injection system 1 can be controlled from a topside control station 8 via an umbilical 9. A subsea control station 10 may be included in the control of the water injection system 1.

The submerged water filtration station 2 comprises filter stages of successively finer grades as seen in the feed direction of water through the system 1. The filter stages include at least a coarse filtration stage 11, and in an embodiment also a fine filtration stage 12.

In this context separation of particulate matter and microorganisms from the seawater typically involves filtration in several stages using different types of filters. The type of filters applied in seawater treatment processes covers subsea coarse filters and multiple media filters, and membranes used in microfiltration units, ultrafiltration, nanofiltration and reverse osmosis units. The stages of filtration are not principally different from each other except in terms of the size of the pores and the size of molecules they retain. In general terms the pore size or particle size removal capacity of ultrafiltration membranes range from 0.005 to 0.1 micron, whereas the nanofiltration membranes range from 0.001 to 0.01 micron and the reverse osmosis membranes are capable of excluding particle sizes ranging down to 0.0001 micron.

The filter membranes and filter units applied in an embodiment of the present invention are not limited to the exact figures and ranges mentioned here, but are merely introduced as a general illustration of the different stages of filtration which can be applied in the seawater injection system 1.

For example, the coarse filtration stage 11 may be realized as a strainer or as a multiple media filter, whereas the fine filtration stage 12 may be composed of a number of ultrafiltration units 13-13" disposed in a parallel arrangement as indicated in FIG. 1. The fine filtration stage may be supplemented by nanofiltration and/or desalination provided from a nanofiltration unit 14 and/or a reverse osmosis unit 15, if appropriate.

A stage of ionizing irradiation 16 is installed in the feed of water from the seawater inlet 4 to the water injection pump 5. The ionizing irradiation stage may for example be inserted upstream of any filter unit such as upstream of a coarse filter unit or an ultrafiltration unit, possibly in or near the seawater inlet. In principal, the stage of ionizing irradiation may be inserted at any location in the water feed line. In an embodiment it may however be arranged with at least one fine filtration stage in the flow downstream of the ionizing irradiation stage 16, in order to remove inactivated organic matter from the injection water. In an embodiment is arranged with at least one coarse filtration unit in the flow upstream of the ionizing irradiation stage 16 in order to remove solid inorganic material which may otherwise shield organic material and microorganisms from the energy of radiation. For both of the aforesaid reasons the embodiment of FIG. 1 may foresee that the ionizing irradiation stage 16 is located between the coarse filtration stage 11 and the fine filtration stage 12.

The ionizing irradiation stage 16 comprises at least one, and in an embodiment a set of, radiation sources 17 arranged in the feed of water through the water injection system 1. The radiation sources 17 are distributed to ensure penetration of the complete body of water. To this purpose the inlet water flow 4 may be split into multiple flows through parallel pipe sections 18 each one associated with one or more radiation sources 17 as shown in the embodiment of FIG. 1. The pipe can also be arranged with multiple passages around a radiation source.

Figure 2:
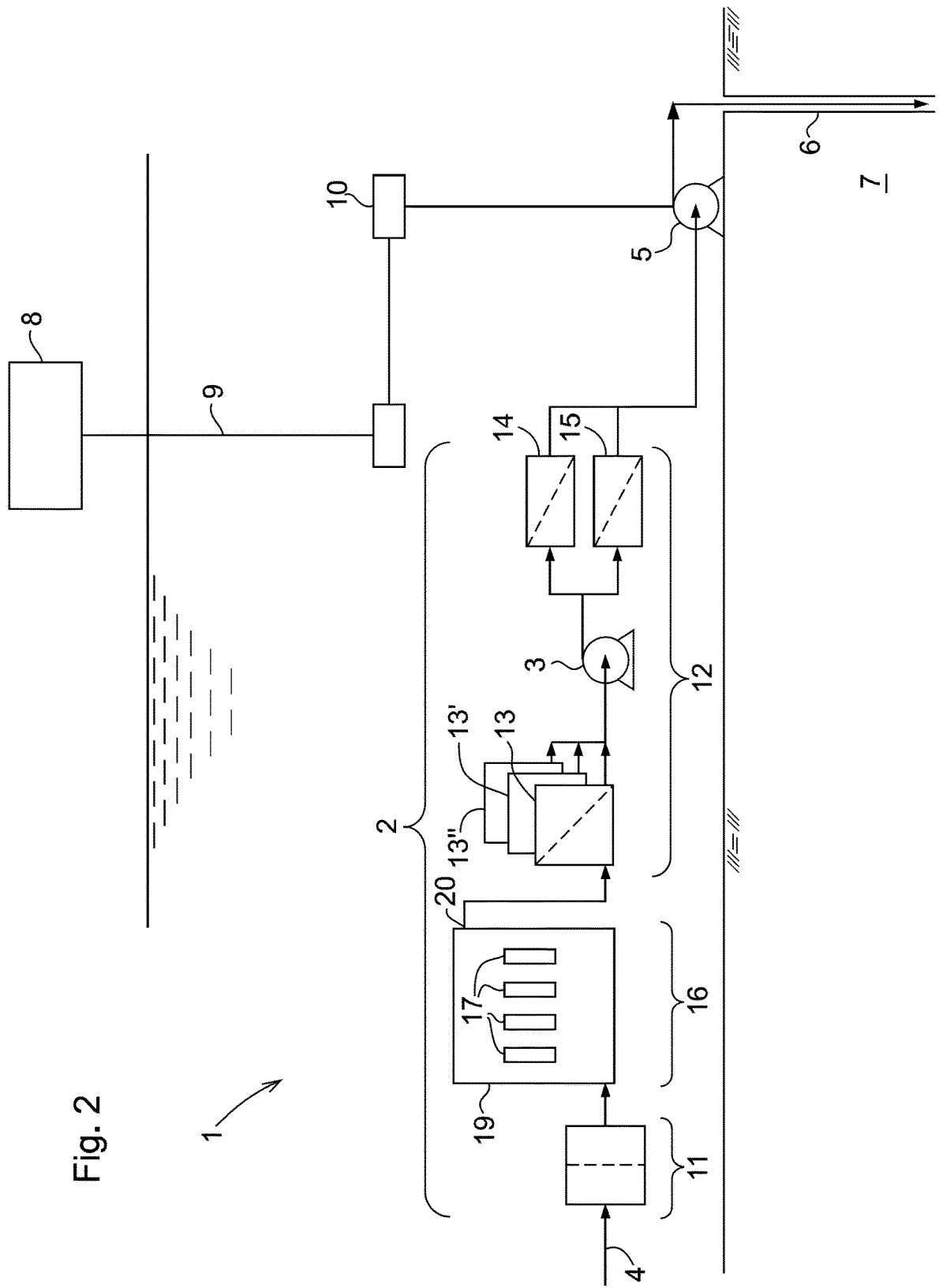
FIG. 2 shows an alternative configuration of the water injection system.

An alternative embodiment of the water injection system 1 is shown in FIG. 2, wherein the same elements that constitute the embodiment of FIG. 1 are given the same reference numbers. In the embodiment of FIG. 2 the ionizing irradiation stage 16 is however differently structured in that the inlet water 4 is introduced in a tank 19 containing a number of radiation sources 17. The tank is dimensioned to permit the water a dwelling time in the tank sufficient to ensure complete penetration of the whole body of water that rises through the tank to an overflow outlet 20.

Alternative arrangements of radiation sources 17 in the water feed through the water injection system 1 are illustrated schematically in FIGS. 3-5. Thus, FIG. 3 shows a sectional view of a water pipe 21 surrounded by a number of radiation sources 17 distributed about the exterior of the water pipe 21. FIG. 4 shows a corresponding sectional view of a water pipe 21 wherein a number of radiation sources 17 are distributed inside the interior of the water pipe. FIG. 5 shows a sectional view of an arrangement wherein water pipes 21 and radiation sources 17 are arranged in an array configuration.

Yet an alternative realization of the ionizing irradiation stage 16 is illustrated in FIG. 6. In the embodiment of FIG. 6 a set of radiation sources 17 are installed in a widened pipe section 22 of a water pipe 21. The radiation sources 17 are supported inside a shield 23 which encloses the energy emitted from the radiation sources 17 inside the widened pipe section. The shield 23 may be arranged so as to constitute a portion of the pipe wall.

Figure 7A:
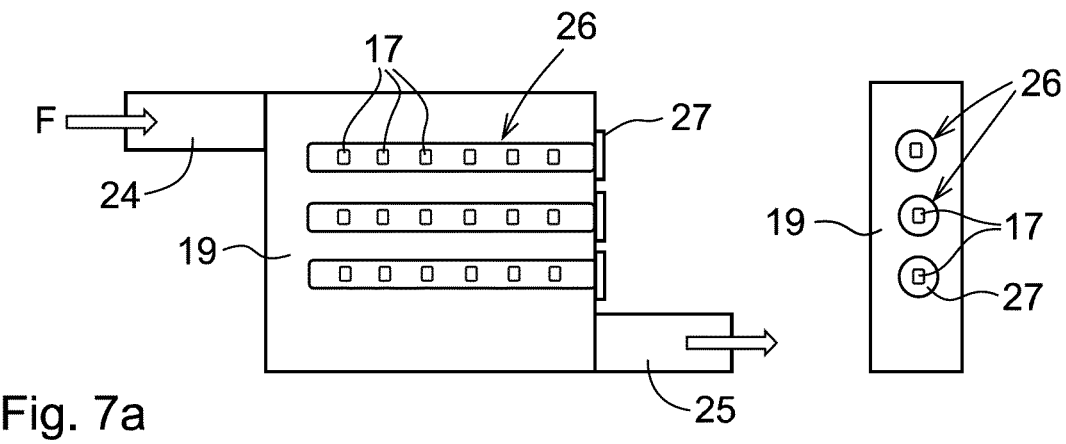
FIGS. 7a-7c show yet other alternative designs of the radiation source.
Figure 7B:
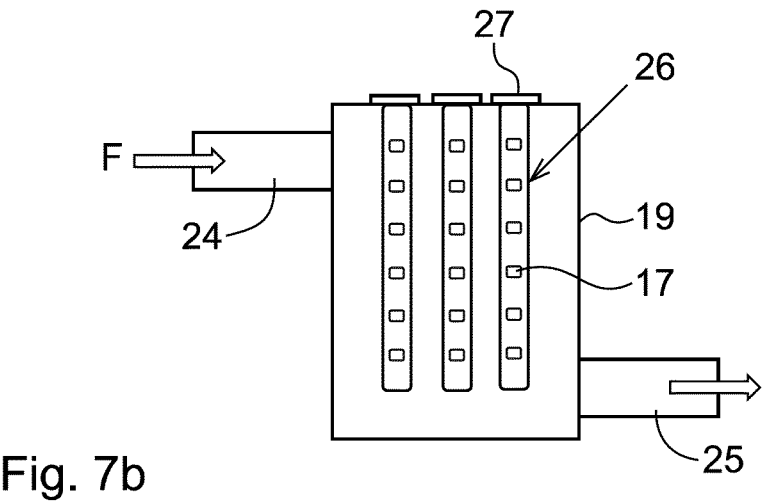
Figure 7C:
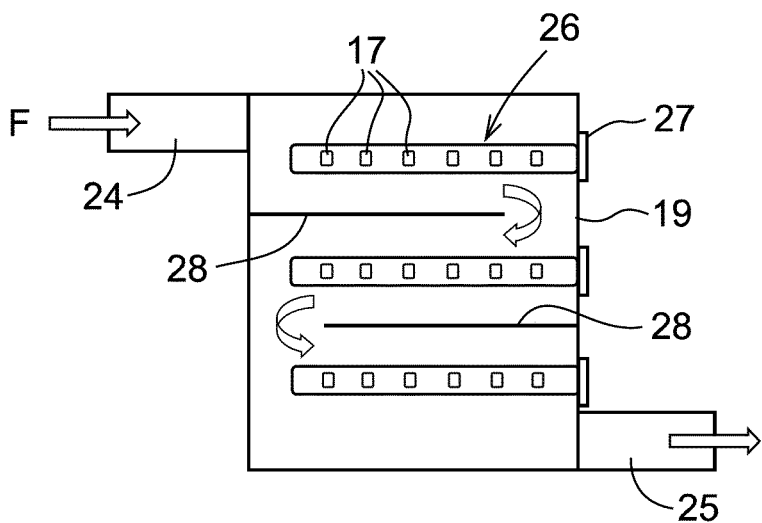

Other alternative designs of the ionizing irradiation stage 16 are shown in FIGS. 7a-7c, all of which refer to embodiments of the tank 19. In all cases injection water is fed through the tank 19 as indicated by arrows F, from a tank inlet 24 to an outlet 25. A set of irradiation cartridges 26 are installed from outside the tank, each irradiation cartridge 26 carrying a number of radiation sources 17. The cartridges may be arranged with an ROV interface 27 for installation by a remotely operated subsea vehicle. FIG. 7a shows the front and side views of an embodiment wherein the irradiation cartridges 26 are oriented horizontally in the tank 19. FIG. 7b shows in a corresponding side view an embodiment wherein the cartridges are vertically oriented. FIG. 7c shows an embodiment wherein the cartridges 26 are installed in passages defined by partition walls 28 in a tank which is formed as a labyrinth. The embodiments of FIGS. 7a-7c all provide an extended dwelling time in the tanks and thus a prolonged exposure to radiation. The embodiment of FIG. 7c ensures maximum exposure to radiation for the complete body of water which is guided along the irradiations cartridges 26 from the inlet 24 to the outlet 25.

In an embodiment the source of radiation 17 to be used in the present method and system is a Cobalt-60 isotope that is available in rods which can be assembled and encapsulated to form a rod or pencil. The half-life of Cobalt-60 is about 5.5 years which corresponds approximately to a decay of 13% per year, making the Cobalt-60 element a suitable energy source for underwater applications since supplementing or substitution of elements may be required on a frequent basis of every three to five years. Gamma rays penetrate well in water and Cobalt-60 elements can be combined in sufficient numbers to provide the required dosage.

The direct and indirect effects of gamma ray irradiation on water and microorganisms in water is known and well documented in the literature and need not be further discussed in this context. It is well within reach for the skilled person to find empirically without undue experimentation the numbers of Cobalt-60 elements and the effects required to reach an effective dosage for a specified flowrate of injection water. A dose rate in the order of 0.001 to 25 kGy (kilo Gray) is considered to have effect on fungi, bacteria and even viruses.

Alternative ionizing radiation sources beside the gamma ray emitting Cobalt-60 are electron beam and X-ray generators. Accelerated electrons and X-rays may for some applications be less preferred than gamma rays which provide greater penetration depth in water than said alternatives.

A non-ionizing irradiation stage may be included in the water injection system as supplement to the ionizing irradiation stage 16. The non-ionizing irradiation stage may be based on an UV-light source (such as a 254 nm germicidal lamp) which is then installed in the injection water flow. If appropriate the UV-light source may be installed in the water flow upstream of the ionizing irradiation stage 16.

The listed radiation schemes can all be seen as different electromagnetic representatives for a Disintegrating High Frequency Oscillation (DHFO) treatment of injection water. Under this title there is room for also other than electromagnetic solutions, such as purely mechanical disinfection schemes.

The scope of the present invention as disclosed above and in the drawings is defined in the appended claims, covering the embodiments disclosed and modifications which can be derived therefrom without leaving the scope of the invention.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for water injection into an oil and/or gas containing subterranean formation, the system comprising:
    a water filtration station, the water filtration station being submerged;
    a pump configured to feed seawater through the water filtration station to a water injection pump, the pump being submerged;
    the water filtration station comprising:
    an ionizing irradiation stage installed at a location between a seawater inlet and the water injection pump, the ionizing irradiation stage comprising a radiation source which is distributed and configured to penetrate the water passing through the stage, the radiation source comprising a plurality of radiation elements, wherein each radiation element of the plurality of radiation elements is positioned external to a plurality of pipe sections, the plurality of pipe sections arranged in an array configuration such that each pipe section of the plurality of pipe sections is parallel to each other pipe section of the plurality of pipe sections, and wherein a radiation element of the plurality of radiation elements is positioned such that at least four pipe sections of the plurality of pipe sections are arranged distributed equally around the radiation element and each radiation element of the plurality of radiation elements includes a plurality of radiation sources; and
    a fine filtration stage comprising a first filtration stage having a first particle size removal capacity and a second filtration stage having second particle size removal capacity different than the first particle size removal capacity, wherein the pump is positioned downstream of the ionizing irradiation stage between the first filtration stage and the second filtration stage so that the seawater is guided past the radiation source before passing through the first and second filtration stages and before being injected into the subterranean formation by water injection pump.

2. The system of claim 1, wherein the radiation source includes a shielding capsule functioning as a pipe wall or a tank wall.

3. The system of claim 1, wherein the radiation source is placed in a coarse filter, a membrane filter, a pump, or any other component in the system to improve disinfection.

4. The system of claim 1, wherein the fine filtration stage comprises a nanofiltration unit or a reverse osmosis unit.

5. The system of claim 1, wherein the fine filtration stage comprises a nanofiltration unit and a reverse osmosis unit.

6. The system of claim 1, further comprising a non-ionizing irradiation stage to supplement the ionizing radiation stage.

7. The system of claim 1, wherein the plurality of radiation elements are a plurality of rods each comprising an encapsulated Cobalt-60 isotope.

8. The system of claim 1, further comprising a third filtration stage upstream of the ionizing irradiation stage, the third filtration stage having a third particle size removal capacity different than the respective particle size removal capacities of the first and second filtration stages.

9. The system of claim 1, wherein the plurality of radiation elements are distributed such that, a second radiation element of the plurality of radiation elements is arranged between each of two adjacent parallel pipe sections of the array configuration.

* * * * *